US007168685B2

(12) United States Patent
Miner

(10) Patent No.: US 7,168,685 B2
(45) Date of Patent: Jan. 30, 2007

(54) VEHICLE JACK AND STAND

(75) Inventor: Michael Wayne Miner, 1003 S. Glenn, Wichita, KS (US) 67213

(73) Assignee: Michael Wayne Miner, Wichita, KS (US)

( * ) Notice: Subject to any disclaimer, the term of this patent is extended or adjusted under 35 U.S.C. 154(b) by 114 days.

(21) Appl. No.: 10/846,574

(22) Filed: May 17, 2004

(65) Prior Publication Data

US 2005/0253121 A1 Nov. 17, 2005

(51) Int. Cl.
*B60P 1/48* (2006.01)

(52) U.S. Cl. ........................................ 254/8 B

(58) Field of Classification Search ................ 254/8 B, 254/133, 134, 1

See application file for complete search history.

(56) References Cited

U.S. PATENT DOCUMENTS 6,375,160 B1 * 4/2002 Hung ........................ 254/8 B

* cited by examiner

*Primary Examiner*—Robert C. Watson
(74) *Attorney, Agent, or Firm*—Bradley P. Sylvester

(57) ABSTRACT

An improved vehicle jack and jack stand is provided, used separately or in combination, where the both the vehicle jack and jack stand are adapted to receive and support a cup means that also supports a block. The block is able to be interchanged with other blocks to accommodate virtually any type of vehicle. A single jack is able to be used with multiple jack stands, since each jack stand is able to provide support at the identical location as the jack does. This is extremely useful on vehicles with uni-body construction. The jack stand defines an adjustable head, where the head is able to fit between side members of the jack stand, so that both the jack and jack stand are able to be concurrently positioned beneath the cup and block means. The jack stand also provides a removable cross support, which allows the jack stand to be moved in or out of position while the jack is being used to elevate an automobile. The support is replaced prior to the time that the vehicle is lowered onto the jack stand.

14 Claims, 3 Drawing Sheets

FIG 3
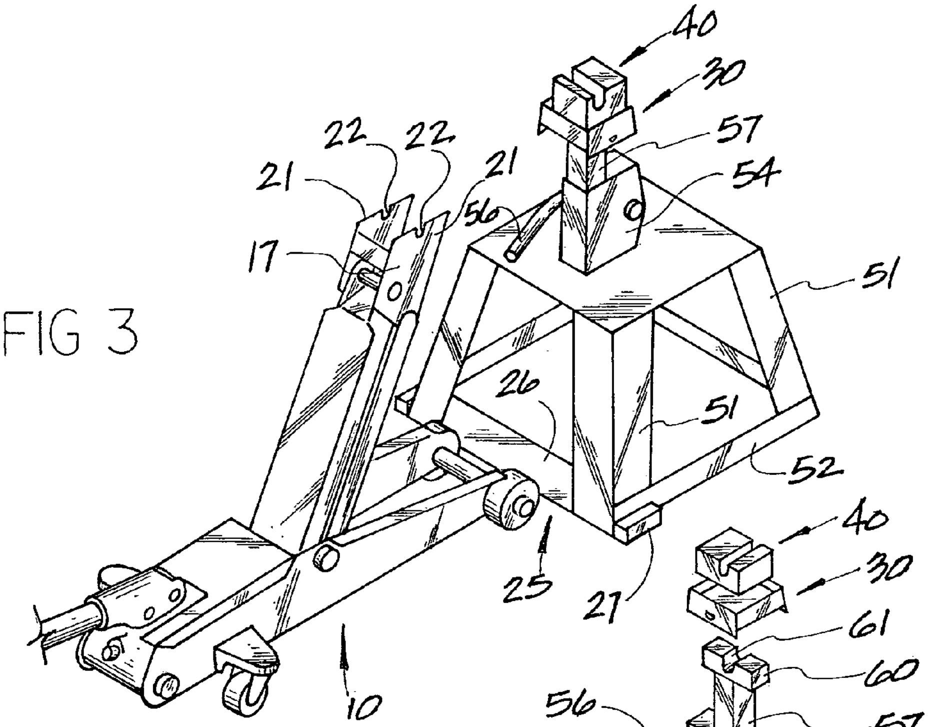
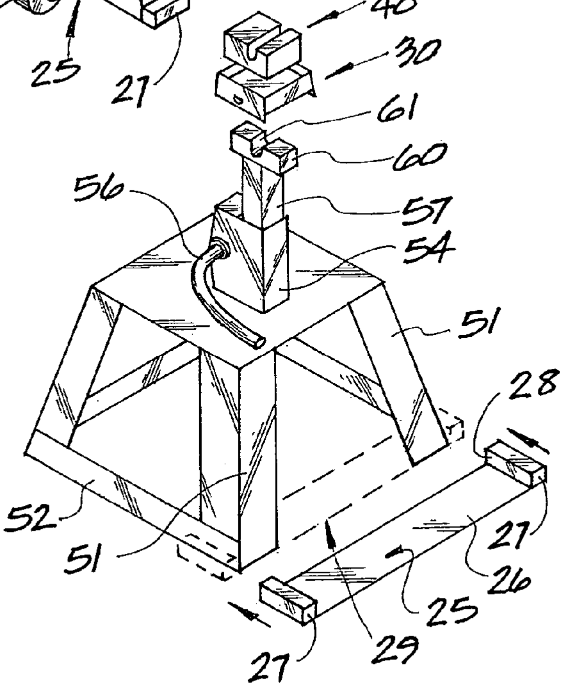
FIG 5
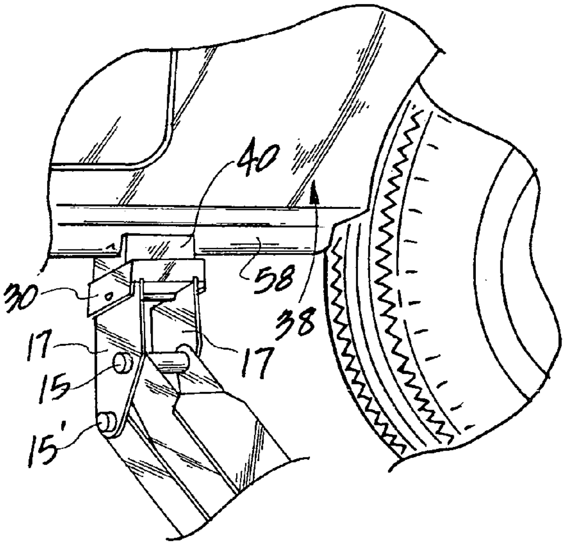
FIG 4

VEHICLE JACK AND STAND

BACKGROUND OF THE INVENTION

Automobile jack safety is a concern with any person using such a device. This invention is specifically directed toward the incorporation of a floor jack with a jack stand, and allows a jack stand to replace the floor jack to provide a steady and secure support means for an automobile, or other contrivance elevated off of the ground.

When hydraulic jacks are used, there exists an ongoing potential for failure of the jack during operation. Since the jack has moving parts, each moving part is subject to wear. The hydraulic system used is subject to deterioration in the cylinder, the valves, and any other parts of said jack that are directly used to support the vehicle during lifting. Large hydraulic jack systems have been able to take advantage of braking systems, such as described in U.S. Pat. No. 3,783,983 (McNally et. all). Floor jacks are generally not intended to be used as a sole support means for items such as automobiles, but generally require jack stands for continuous support, or a braking device incorporated into a floor jack.

Floor jack safety devices have been utilized, in which manual braking systems have been incorporated, such as that shown in U.S. Pat. No. 4,635,902 (Chou). Chou discloses a hydraulic stem shaft having coupling grooves which allow a locking mechanism to engage within a desired groove, thus locking the position of a floor jack. One of the major problems with this jack, as compared with present invention, is that the jack in Chou only allows it to be used to raise a vehicle at a single point of contact. The usefulness of the safety mechanism is diminished if an entire front end of a vehicle needs to be raised and worked on for a lengthy period of time. Using the Chou jack, at least two such jacks would be necessary to raise the front end of an automobile off of the ground, and maintain it in that position for a period of time. If an entire vehicle needed to be raised off of the ground, as many as four jacks would be necessary.

A similar idea was described in U.S. Pat. No. 5,221,073 (Shockley), in which various notches were provided along the length of opposing side plates, with the safety means brace able to fit within specific notches, and provide a support to the lifting arm of the floor jack if the floor jack hydraulic means failed. This particular invention was only able to provide a safety means to maintain the support of the vehicle at a specific point, and was not readily usable with a floor jack in any manner other than that had previously been known.

Another jack safety device is disclosed in U.S. Pat. No. 5,618,029 (Chung), which provided a catch mechanism located at the front end of the floor jack, in which a safety hook was used to maintain the position of the support arm.

A subsequent safety means was incorporated into a floor jack in U.S. Pat. No. 5,878,996 (Chung). In this invention, a ratchet and a pawl were used to maintain position of the support arm in an elevated position. This patent provided a different type of locking means, but the overall usefulness of this invention with a floor jack was no different than any of the other floor jacks that had preceded it.

Additional variations on the concept of making a floor jack stable under stress includes the placement of a block underneath the lifting arm, as shown in U.S. Pat. No. 5,984,270 (Hussaini et al.). Again, this safety device requires that a single jack be used at a single location, and is not readily incorporated with the use of a floor jack.

Jack stands are intended to replace floor jacks that have previously raised the object to a desired height. With older model automobiles, the person would simply jack up a portion of the automobile using the frame as a contact point, and place the desired jack stands underneath the frame of the automobile. As uni-body construction has become more prevalent on automobiles, there are now fewer points with which jack stands can be used. The typical uni-body automobile provides specific locations for the use of a floor jack. For example, on many automobiles, only a single point of contact is defined along the side of many uni-body automobile designs, which also have a specific contact structure that fits within the parameters of the vehicle contact point.

Adjustable jack stands are used to replace jacks, in which a single jack may be used to elevate an automobile at multiple points, with each point able to be supported on a jack stand after the vehicle is lowered onto it, with a floor jack then removed. The jack stand is intended to be a nonmoving support structure, with little risk involved as to failure. These stands have involved modifications regarding the adjustability as to height, as shown in U.S. Pat. No. 5,520,360 (Wensman), which allow for multiple adjustable means for height included into a single jack stand.

The utility of jack stands is also shown in U.S. Pat. No. 5,901,935 (Lai), in which a height adjustable jack stand is shown, in which the structural design allows for the jack stand to fold up for easier storage. The prior art regarding jack stands deal with the adjustable features regarding use with an automobile or other object after it has been lowered onto the jack stand by a separate floor jack. In the prior art, floor jacks provide an upward force on the automobile at a different point than the jack stand provides support. The main reason for this is that the base of both the floor jack and the jack stand have been unable to concurrently share the same space underneath the automobile or other object desired to be lifted.

The present invention has modified both the floor jack and jack stand so that they work in combination with each other and are both able to occupy the same area beneath the automobile or other object being supported. This is especially important when dealing with uni-body construction, where only a single area along one side of an automobile may be provided for purposes of jacking the automobile upward.

It is therefore an object of this invention to provide an integrated floor jack and jack stand that are able to be used to concurrently with a single structural position on an automobile or other object desired to be lifted.

Is a further object of this invention to provide a floor jack and jack stand that can be used with a uni-body automobile.

It is a further object of this invention to provide a means whereby a single floor jack may be used on specific structural positions on an object with the same specific structural positions used by the jack stand.

It is a further object of this invention to provide a novel method of elevating an automobile having a uni-body construction.

SUMMARY OF THE INVENTION

A typical floor jack has a lifting arm which is comprised of a major and a minor lever, which work in unison to keep the peripheral ends of the lever arms oriented so that they provide a continuous horizontal connection point. This connection point is generally defined as a cup or other flat-surfaced member that is intended to directly contact the vehicle which is desired to be lifted.

The connection point is replaced by two side members which are pivotally attached to the peripheral ends of the lifting arms, and where the side members have a straight line end which follows a horizontal direction and defines a platform notch. As the arms pivot upward and downward, the straight line ends of the side members remain horizontal throughout the lifting and lowering process.

A platform has a ½ bar defined on its underneath side, which protrudes outward. The ½ bar may be an actual portion of a rod, where the rod has been cut in half to form two equal halves, or the ½ bar may also comprise a protrusion that projects outward from the platform. In either case, the protrusion or ½ bar is intended to be capable of being positioned into a pair of receiving notches defined on the top portion of the side members of the floor jack. The protrusion or ½ bar is continuous across the underneath side of the platform. For purposes of further discussion in this section, the term protrusion and ½ bar will be consolidated into the single term "½ bar."

The platform is placed on top of the straight line ends of the side members, and a support block is placed on top of the platform. The platform preferably has lower and upper side wall extensions. The lower side wall extensions, and the protrusions or ½ bar prevent the platform from moving or sliding off of the floor jack side members. Likewise, the upper side wall extensions provide a tray assembly, so that a block placed on the top portion of the support means will also not slide horizontally off of the support means.

The floor jack, having the side members with the platform means and block, is placed underneath the vehicle or object desired to be elevated. The floor jack is operated so that the lifting arms pivot upwards, until the support block engages the desired location of the automobile or object desired to be lifted. The support block may define a support slot, into which the flange or portion of the automobile designated as a lifting point fits within said slot.

As the floor jack is operated, the lifting arms move the side members upward, urging the platform and support block upward against the underneath side of the vehicle or object desired to be lifted. The vehicle or object is elevated to a desired height, and a jack stand is situated directly beneath the point of contact between the support block and the vehicle or object being lifted.

The space between the side members is sufficient to accommodate the width of a jack stand extension arm. The jack stand extension arm is positioned between the floor jack side members, with the jack stand extension arm having a top end that provides a horizontal surface with a platform groove, that allows the platform and ½ bar to rest within said platform groove.

The jack stand may have a horizontal leg support removed, so that the jack stand can be placed around the floor jack. The removable horizontal support is then put back into position so that the supporting legs do not spread out when weight or masses are applied downward to the jack stand.

Once the jack stand is in position, with the jack stand extension arm positioned between the floor jack side members, immediately below the raised platform, the floor jack is lowered until the platform comes to rest and is supported completely by the jack stand extension arm. The floor jack is lowered until the entire floor jack assembly is able to be rolled out from underneath the jack stand. The jack stand provides the necessary support to the object, by providing an unyielding support beneath the platform which in turn supports the block which is in direct contact with the vehicle or object being elevated.

The block is preferably formed out of polyurethane, or may be out of any suitable material that can withstand application of mass to it without significant deformation. The use of multiple jack stands is available, with a single floor jack being used to elevate the vehicle or object at multiple points.

The utility of this invention is clear where a uni-body automobile is being elevated, where the automobile only provides a single notch or position along its side that is designated as the contact point for lifting. Use of this modified floor jack and modified jack stand allow that single contact point to be used for raising, as well as for stationary long-term support, which reduces the chance of injury in the event of a floor jack failure.

All portions of this invention are reusable. Modified blocks may be substituted, allowing the block to be placed underneath an axle, or other support member, which may be available with older style vehicles, or object having some type of frame assembly.

Removing the vehicle or object from the jack stand comprises reversing the process previously described, where the floor jack is positioned underneath the jack stand, with the wheels directly under the jack stand extension arm, and the side members immediately beneath the supported platform, with the jack stand extension arm situated between the side members. By actuating the floor jack causing it to move the lifting arms upward, a platform will be raised off of the stationary jack stand, to the point where the platform ½ bar is raised out of the jack stand end notch. The jack stand is then able to be removed from underneath the vehicle or object, and the floor jack may safely lower the vehicle or object back down to its former level.

DESCRIPTION OF THE FIGURES

FIG. 3 is a perspective view of the floor jack and jack stand, in which the engagement block had been placed on the jack stand head, and where the floor jack has been rolled away from the jack stand, leaving the jack stand to support the vehicle.

FIG. 4 is a perspective view of the floor jack shown in the act of elevating a vehicle using the engagement block, prior to use of the jack stand for stable support.

FIG. 5 is an exploded perspective view of an improved jack stand, showing the removable support, the cup and engagement block, that are able to rest on top of the jack stand head.

DETAILED DESCRIPTION OF THE PREFERRED EMBODIMENT

Figure 1:
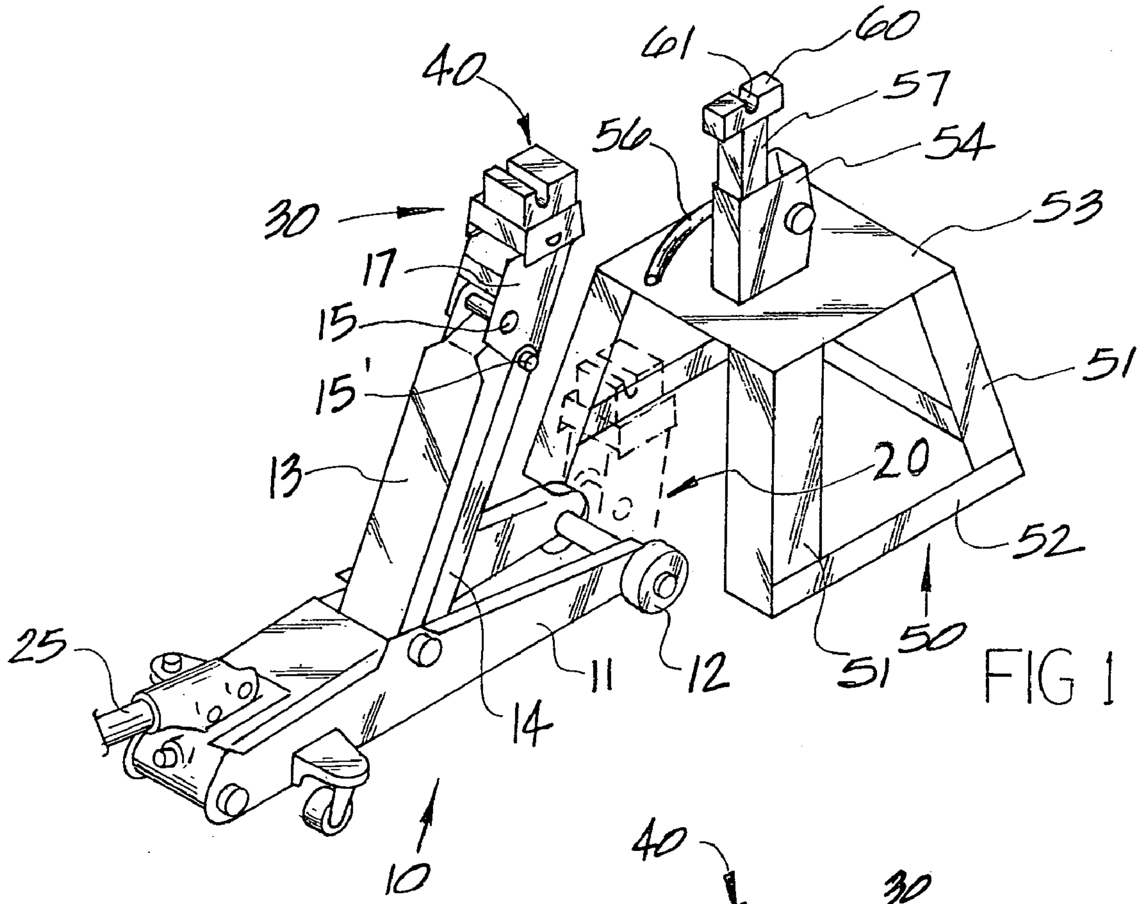
FIG. 1 is a perspective view of the floor jack and improved jack stand, where the floor jack is shown in an elevated and lowered position.

Referring now to FIG. 1, a floor jack 10 is shown with the jack 10 placed adjacent to an improved jack stand 50. Floor jack 10 is comprised of a base 11 with forward mounted wheels 12. Floor jack 10 has a lifting means comprised of a top elevating member 13 and a bottom elevating member 14. The peripheral ends of members 13 and 14 rotate upward and downward in unison, as is commonly known and understood in the art of floor jacks. The top member pivot pin 15 is shown with the pivot pin 15' for the bottom elevating member 14 also shown.

Figure 8:
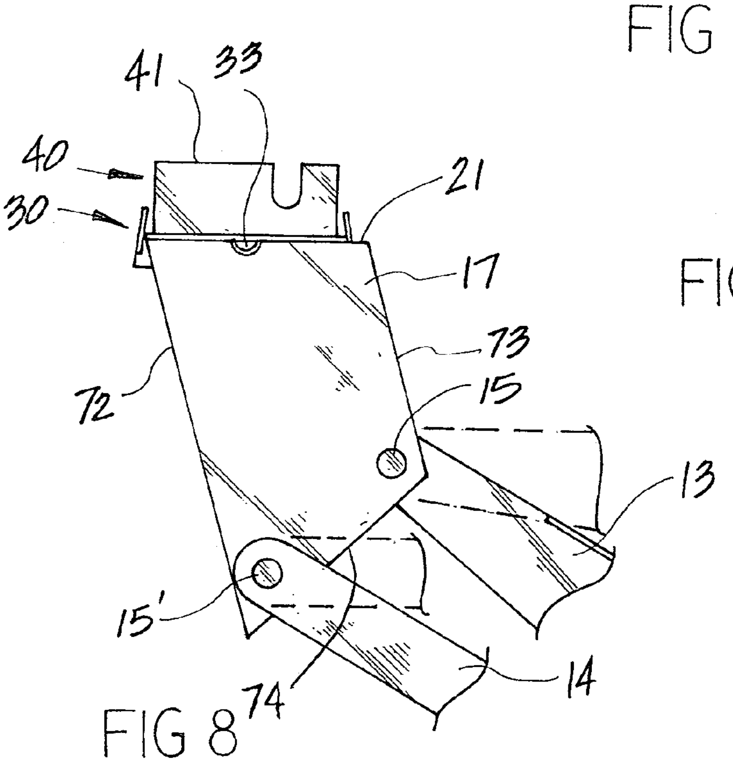
FIG. 8 is a side view of the upper portion of the floor jack showing the side members, and the cup on top of said side members, with the relative angle of the side members shown as a constant angle, regardless of the raised and lowered position of the elevating members.

As FIG. 1 shows, members 13 and 14 are attached to the base 11 on one end, and support a pair of spaced side members 17. Said side members 17 comprise generally flat panels of rigid material, such as steel plates, that define pivot points on their top and bottom ends. It is commonly known and understood in the art that the movement of top member 13 and bottom member 14 in relation to each other will orient the top pivot pins 15 and 15' so that pivot pins 15 and 15' have the same relationship in position to each other as determined from a vertical and/or horizontal axis. This will cause side members 17 to remain in the same angled position, regardless of the operating elevation of members 13 and 14. A further example of this is shown in FIG. 8, in which the angled position of side members 17 remained constant, so that the top edge 21 of the side members 17 remains horizontal whether or not said side members 17 are in a raised or lowered position. The relative angle on the elevating members 13 and 14, as compared to the side members 17 may vary, but the relative position and angled inclination of the pivot points 15 and 15' remains constant regardless of the elevation of the members 13 and 14.

Referring now also to FIG. 3, the side members 17 define a top flat edge 21, which maintains its horizontal angle regardless of the angle of elevating members 13 and 14. As FIG. 1 also shows, when the elevating members 13 and 14 are lowered to position 20, side members 17 will remain in the same angular position, as shown in the raised or elevated position.

FIG. 8 shows a side view of the side members 17 which comprise polygon shapes, having two generally parallel sides 72 and 73, with a top angled side 21 and a bottom angled side 74. FIG. 8 depicts the side members 17 in relation to the elevating members 13 and 14, when said elevating members 13 and 14 have been raised to their maximum height. FIG. 8 also depicts the relationship and orientation of elevating members 13 and 14 that have been lowered, with side members 17 oriented in relation to elevating members 13 and 14.

The flat edge 21 of each side member 17 defines a support platform receiving notch 22. Said notch 22 generally comprises a hemispherical configuration, that would allow stable positioning of a ½ rod or ½ circular rod 33, having a radius less than the maximum radius of the notch 22, when the rod or circular member is disposed within said notch 22. It should be understood that the term ½ rod should include a complete section of a ½ rod that extends across the width of the cup 30. Likewise, the term ½ bar 33 should also be considered to comprise a protrusion that has characteristics similar to that shown for the ½ bar 33. The protrusion should have a radius less than the notch 22, so that the protrusion or ½ bar is capable of being contained within said notch 22. The protrusion described shall extend across the bottom surface of the cup 30.

While side members 17 are shown as polygons having two generally parallel sides 72 and 73, with angled sides 74 and top horizontal side 21, this configuration is shown as the preferred embodiment, but is not required for operation of this invention. What is required, regarding the shape and configuration of said side members 17, is that they be able to define pivot points 15 and 15', while maintaining a proper horizontally configured top edge 21 so that edge 21 remains horizontal in relation to the angled relationship of the operation of the jack 10.

Side members 17 are spaced apart, defining a gap between them, which must be of sufficient width between them to allow the placement of a jack stand extension arm 57 and head 60 between said spaced apart members 17. Side members 17 are generally spaced apart by pivot pins. The gap between said side members 17 is preferably uniform, with side members 17 being parallel to each other, and parallel to the orientation of the elevating members 13 and 14, so as to provide maximum support without shear stress on the members 17, or pivot pins 15 and 15'.

Figure 6:
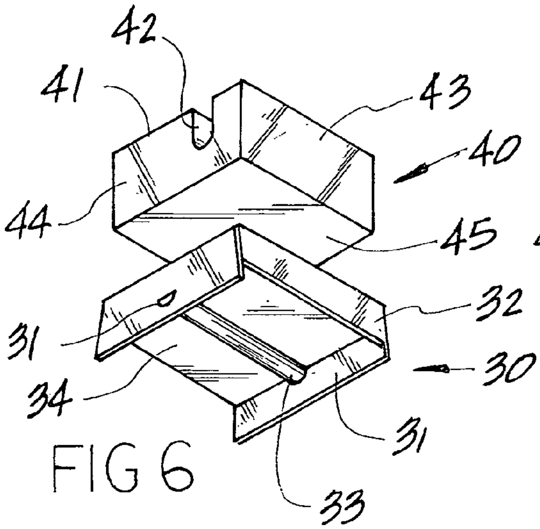
FIG. 6 is a perspective exploded view of the engagement block and supporting cup, as seen from beneath said items.
Figure 7:
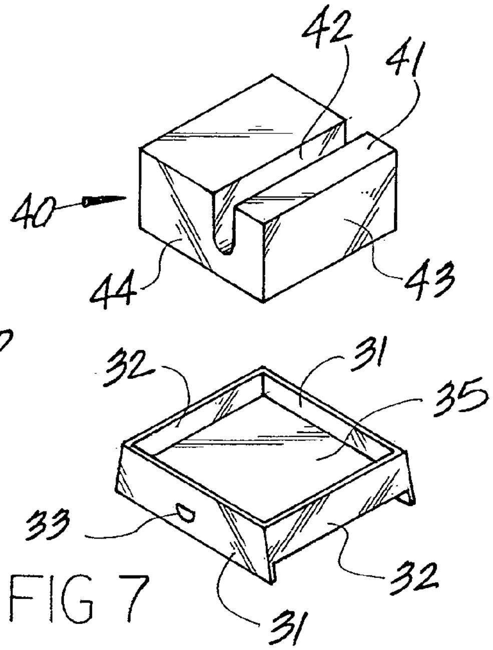
FIG. 7 is a perspective exploded view of the supporting cup and engagement block as seen from above said items.

The floor jack 10, supports a cup 30 that is placed on top of the horizontal portions of the side members 17. Referring now also to FIGS. 6 and 7, the cup 30 defines a flat plate surface having a top side 35 and a bottom side 34, with the peripheral edges of the plate defining vertical side flanges 31 and 32, where said flanges 31 and 32 project upwards above the top surface 35, and where bottom flanges 31 project downward below bottom surface 34, forming a gap between the downward projecting flanges 31.

As FIG. 7 shows, the top surface 35 provides a surface that is able to receive and support an engagement block 40, with the bottom side 45 of said block 40 engaging and being supported by surface 35. Side flanges 31 and 32 provide a peripheral edge restraining wall that limits lateral movement of the engagement block 40 when it is so disposed within the cavity defined on the top side of the cup 30.

Referring now also specifically to FIG. 6, the underside of the cup 30 comprises a bottom surface 34 in which opposing downward projecting side flanges 31 provide a gap, and where said opposing side flanges 31 support a ½ bar 33. The ½ bar 33 is defined across the bottom surface 34 of the cup 30. The ½ bar 33 is contained within the underside cavity defined by the bottom surface 34 and side flanges 31. It should be understood that the ½ bar 33 may comprise any other shape or configuration, that is able to be received into the defined notch 22 on the top edge 21 of the side members 17. For example, the ½ bar may be a protrusion or ridge defined on the bottom surface 34 itself. The figures depict the ½ bar 33 as being an independent ½ bar of rigid material that is supported by the downward projecting portion of flanges 31, with the ½ bar 33 being supported on its ends by said flanges 31.

Figure 10:
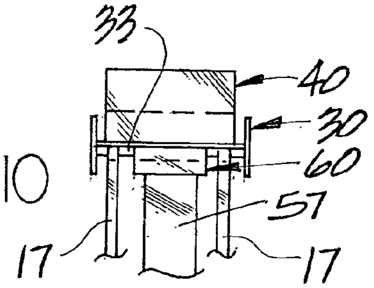
FIG. 10 is an end view of the side members, cup and engagement block, shown in position immediately above the jack stand head.

As is also shown in FIG. 8, the engagement block 40 is supported by the cup 30, which in turn rests on the top edges 21 of side members 17. As is shown in FIGS. 6, 7 and 8, flanges 31 extend downward and are spaced apart to define a gap greater than that defined by the parallel side members 17. Therefore, flanges 31 are intended to extend downward adjacent to and parallel to the outer top sides of side members 17. This prevents any lateral movement from side to side, as the flanges 31 will contact the outer sides of side members 17, as also shown in FIG. 10. Movement backward and forward is prevented by use of the ½ bar 33 which is able to fit within notch 22, as defined by side members 17.

The cup 30, so situated on top of side members 17 is unable to move in any direction horizontally, and provides a stable support surface for the engagement block 40.

The support block 40 is comprised of any resilient material that resists crushing or deformation under stress. Support block 40 is comprised of a bottom surface 45 that is able to rest on top surface 35 of cup 30. The sidewalls 43 and 44 of the engagement block 40 define a shape that has dimensions which allow it to fit within the defined dimensions of the flanges 31 and 32, defined on the cup 30.

The support block 40 typically has a groove 42 that extends all the way across the top surface 41 of the support block 40. As is also shown in FIG. 4, the floor jack 10 has side members 17 that support a cup 30, with an engagement block 40 having a groove 42, and which are positioned below the desirable support contact point of the uni-body vehicle 38, in which such contact support point comprises a downward facing flange 58. Said flange 58 is disposed within the groove 42 of support block 40. The floor jack 10 raises up the cup 30 and engagement block 40 to the point where the vehicle is elevated, as shown in FIG. 4.

An improved jack stand 50 is shown in FIGS. 1, 2 3 and 5, in which the base supports an extension arm 57. The base portion of said stand 50 has four support legs 51, which support a top cover 53. An extension housing 54 is defined above the top cover, in which an extension arm 57 is disposed. The extension arm 57 is able to move upward and downward, with the relative height of the extension arm 57 fixed in position to the base portion of the jack stand 50. Typically, a lever 56 will actuate a rachet, to adjust and set the height of the extension arm 57.

The jack stand 50 has cross supports, which prevent the angled legs 51 from spreading out or deforming when supporting significant mass. Two adjacent legs 51 have a removable support 25, as shown in FIG. 5, in which said removable support 25 comprises a cross bar, having a length greater than the distance from the outer edges of the support legs 51 at their terminating ends. The cross bar 26 has upwardly projecting prongs 27, which have an interior surface 28, where the distance between the opposing interior surfaces 28 of prongs 27 are slightly greater than the distance between the outer surface of the legs 51 of the jack stand 50.

The removable support 25 is positioned underneath the legs 51 of the stand 50, with the inner surfaces 28 again restricting any spreading of the stand legs 51. In this way, the prongs 27 will prevent the stand legs 51 from spreading out in an undesirable manner under loads. The removable feature allows a jack stand 50 to be placed around the jack 10 without any impedance.

Figure 2:
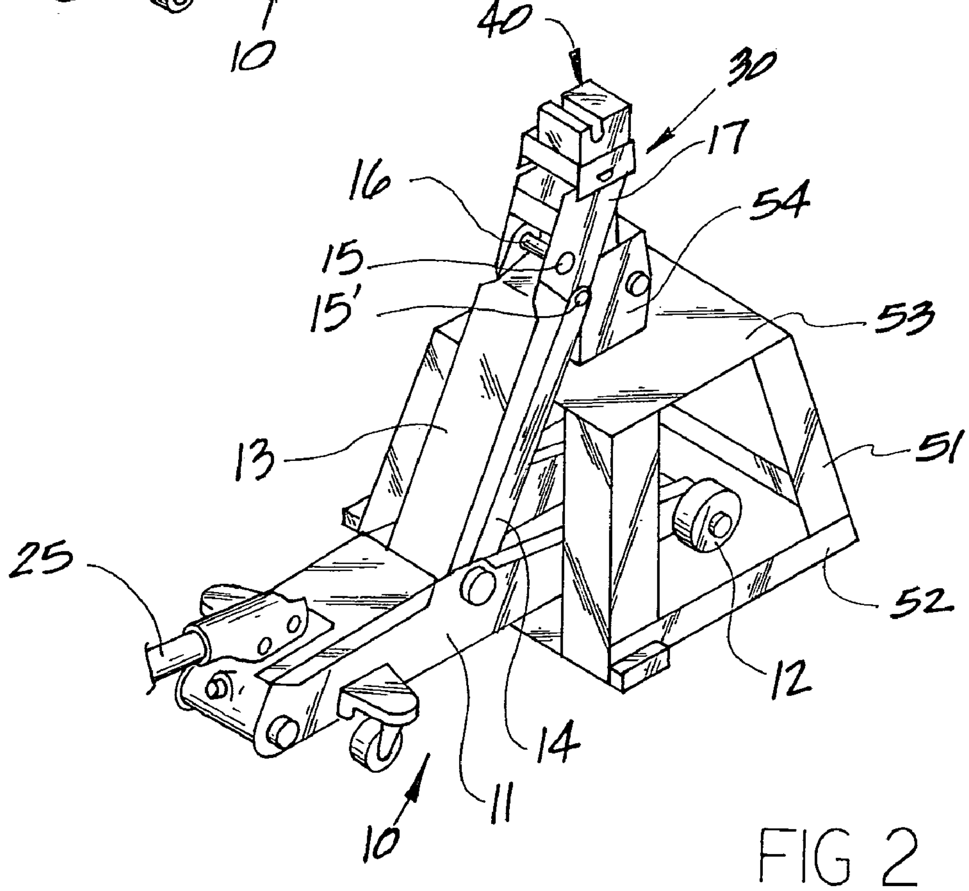
FIG. 2 is a perspective view of the floor jack, shown in an elevated position in which the cup and engagement block are positioned above the head of the jack stand, and where the angle of the view in FIG. 10 is indicated.

Once the vehicle 38 is elevated by the jack 10, as shown in FIG. 4, the mass of a portion of the vehicle 38 will be channeled and supported by the jack 10. Referring now also to FIG. 1, the stand 50, with the removable support 25 taken out, is moved underneath the cup 30 and block 40, so that the extension arm 57, and the head 60 and groove 61 of said arm 57 are positioned immediately below the cup 30 and block 40, as shown in FIG. 2. The jack stand 50 could not be moved underneath the block 40 and cup 30, if a cross support member existed between the two legs 51 that are positioned on either side of the jack 10. The weight of the vehicle 38 applies a downward force on the jack 10, which is also supported by the wheels 12. Since the wheels 12 cannot be raised while so supporting the vehicle 38, this prevents any cross support 52 from being able to be moved underneath the wheels 12 of the jack 10 while said jack 10 is supporting a vehicle.

Referring again to FIG. 2 and FIG. 10, once jack stand 50 has been moved into position, so that the extension arm 57 and head 60 are positioned between the side members 17, the extension arm 57 is raised so that the head 60 is positioned immediately below the cup 30. The removable support 25 is slid underneath the appropriate legs 51 of jack stand 50, so that the upwardly protruding prongs 27 will prevent said legs 51 from spreading outward under stress. The jack 10 is lowered, so that the cup 30 moves downward onto the head 60 of arm 57.

Extension arm head 60 defines a receiving groove 61, that is able to receive the ½ bar 33 of the cup 30. The top surface of the head 60 impacts against the bottom surface 34 of said cup 30, and lateral movement of the cup is prevented by the cup's ½ bar 33 being positioned within the groove 61 of the head 60, and the flanges 31 of the cup 30 that are oriented downward, further prevent lateral movement, as a result of the head portion 60 of the extension arm 57 being completely positioned within the area defined by the downward projecting prongs 31.

As is also shown in FIG. 10, the extension arm head 60 has a width less than the gap between side members 17, and is able to be positioned between said side members 17, with the load supported by the cup 30 and block 40 positioned above said head 60.

Once the vehicle 38 is raised to the desired height, the jack stand 50 is placed around the jack 10, and the cross bar 25 is placed under support legs 51. The extension arm 57 and 60 can then be raised into position just below the ½ bar 33 and cup 30, with notch 61 immediately below the ½ bar 33. The jack stand 50 is able to be moved into position by virtue of the removable support 25, and allows the jack stand 50 to be moved over the base of the jack 10.

Once the jack 10 is lowered, the cup 30 and ½ bar 33 will move into position with the jack head 60, with the ½ bar 33 moving into the groove 61 of the head 60. As the jack 10 continues to lower, the cup 30 will be prevented from moving downward by the head 60. Further downward movement of the jack 10 will result in the side members 17 lowering down with the cup 30 remaining elevated on the jack head 60.

As the jack 10 continues to lower, the weight of the vehicle 38 will be transferred from the side members 17 to the head 60 and extension arm 57 of stand 50. Once the jack 10 has lowered enough, the jack 10 is able to be rolled out from underneath the stand 50. The removable support 25 presents no significant barrier to the jack 10 being removed, as there is not longer any weight borne by said jack 10. Once the jack 10 is removed, it can be used again at alternative locations on the vehicle 38, with additional jack stands 50, so that a single jack 10 can be used to elevate a vehicle 38 at multiple points, with each point able to be supported by a jack stand 50.

Figure 9:
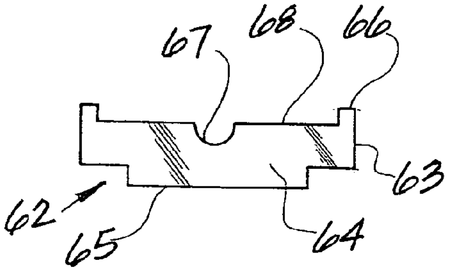
FIG. 9 is a side view of an alternative engagement block, that is intended for use with vehicle frames and axles as the point of contact, rather than vehicles having a unibody construction.

Alternative support blocks 62 may be used, such as shown in FIG. 9. The support block 62 in FIG. 9 has a base side 65, that is able to fit within the top cavity portion of the cup 30, but which defines a broader top surface 68, that would be useable with frames on older model vehicles. Also shown in FIG. 9 is a larger hemispherical groove 67, that would be usable with the larger diameter of vehicle axles. The top surface 68 may further define upward projections 66 on opposing top sides of the support block 62, which are useful to prevent lateral movement of the vehicle frame in relation to the block 62.

The procedure to lower the vehicle 38, and remove the jack stand 50 is a reverse process of that described above. The jack 10 is maneuvered into position and rolled under the jack stand 50, with extension arm 57 of the stand 50 positioned between the side members 17 of the jack 10. Side members 17 are raised so that they contact the underside of the cup 30, with the side members 17 being disposed within the gap defined by the opposing side flanges 31 of the cup 30, and where the side members 17 are elevated so that the cup ½ bar 33 is positioned with the notch 22 of the side members.

Once the side members 17 have been moved into the cup 30 and have the ½ bar 33 positioned in the side member notches 22, the jack 10 is actuated so as to raise the side members 17 upward, elevating the cup 30 and block 40 upward from the stand 50. Once the cup 30 and block 40 have been elevated sufficiently to allow the extension arm 57 to be lowered, as shown in FIG. 10, the stand's removable support 25 is taken off of the stand 50, and the stand is pulled out from under the vehicle 38. The jack 10 is then able to lower the vehicle back to its ground level position.

From the foregoing statements, summary, and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. An improved vehicle jack and jack stand combination, comprising:

a. a floor jack, having a base, with elevating members that are capable of being raised and lowered;

b. side members, spaced apart and define top horizontal edges, where said edges each define a notch that is able to receive a protruding half bar defined on the underside of the cup attached to the elevating members, where said side members each define a top edge that is adapted to receive and support a cup;

c. a cup, having a means to position it on the top edge of the side members, and which is able to support a block; and d. a block, able to rest on top of the cup, where said block defines a surface that makes contact with the underside of the vehicle desired to be lifted.

2. An improved vehicle jack, as recited in claim 1, where said cup comprises a top and bottom surface, with top flanges on its peripheral edges, to form a receiving cup, having sufficient dimensions to receive a block, where the top flanges provide a means to restrict any horizontal movement of the block in relation to the cup.

3. An improved vehicle jack, as recited in claim 1, where said cup defines a protrusion on its bottom side, where said the protrusion comprises a half bar that expands across the underside of the cup.

4. An improved vehicle jack, as recited in claim 1, where the block defines a bottom side, where said bottom side makes contact with the top surface of the cup, and where said block defines a groove for the receiving of the contact point of a uni-body vehicle.

5. An improved vehicle jack, as recited in claim 1, where the block defines a bottom side, and where said bottom side makes contact with the top surface of the cup, with said block defining a groove for the receiving of an axle of a vehicle.

6. An improved vehicle jack, as recited in claim 1, where cup and block are combined into a single member.

7. An improved vehicle jack and jack stand combination, comprising:

a. a floor jack, having a base, with elevating members that are capable of being raised and lowered;

b. side members, attached to the elevating members, where said side members each define a top edge that is adapted to receive and support a cup;

c. a cup, having a means to position it on the top edge of the side members, and which is able to support a block; and d. a block, able to rest on top of the cup, where said block defines a surface that makes contact with the underside of the vehicle desired to be lifted; and e. a jack stand comprising support of legs and head, where the head has a width narrower than the gap defined between the opposing side members of the floor jack, so that said jack head is able to be positioned between the side members of the floor jack, with the head being able to be positioned so that it provides support directly beneath the cup and block concurrently with the vehicle jack.

8. An improved combination floor jack, and jack stand, as recited in claim 7, in which the floor jack up as support legs and cross supports, with one of the cross supports being removable.

9. An improved combination floor jack, and jack stand, as recited in claim 7, in which the floor jack defines a removable cross support, in which the cross support defines upwardly projecting side flanges, which define a gap between them that allows the support legs on one side to be positioned between them.

10. An improved combination floor jack, and jack stand, as recited in claim 7, where the jack stand is able to be positioned around the floor jack, with the head of the floor jack positioned between the side members, with top horizontal edges of the side members and the top of the jack stand head each defining a groove that is able to receive a protrusion on the underside of the cup.

11. An improved combination floor jack, and jack stand, as recited in claim 7, where the jack stand defines a head portion that is adjustable as to height, with head portion defining a groove that is able to receive the crossbar on the underneath side of a cup.

12. An improved combination floor jack, and jack stand, as recited in claim 7, where the block defines a groove for the receiving of an axle of a vehicle.

13. An improved combination floor jack, and jack stand, as recited in claim 7, where the block defines a groove for the receiving of the flange of a lifting point of a uni-body vehicle.

14. An improved combination floor jack, and jack stand, as recited in claim 7, where the cup and block supported by said vehicle jack and jack stand are combined as a single member.

* * * * *